Patented Sept. 7, 1948

2,448,997

UNITED STATES PATENT OFFICE 2,448,997

PIPERIDINE PROPANOL ESTERS OF PHENYLACETIC ACID

Samuel M. McElvain, Madison, Wis., and Thomas P. Carney, Indianapolis, Ind.

No Drawing. Application June 30, 1945, Serial No. 602,656

2 Claims. (Cl. 260—294)

This invention relates to organic chemical compounds and is directed to a new phenylacetic acid ester and salts thereof.

By this invention there are provided new compounds, namely 3-(2'-methylpiperidino)-propyl phenylacetate which may be represented by the following formula:

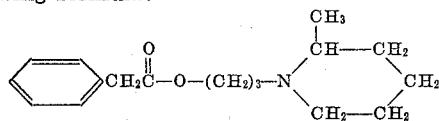

and acid addition salts thereof.

The compound in accordance with the above formula is a phenylacetic acid ester and is a stable, water-insoluble, viscous oil at room temperature. The compound is basic in character and forms addition salts with acids.

Certain of the addition salts of the new 3-(2'-methylpiperidino)-propyl phenylacetate such as the hydrochloride, hydrobromide, sulfate and phosphate, are white crystalline compounds which are readily water-soluble. Other acid addition salts, for example the picrate and methylene-bis-hydroxynaphthoate, are stable, crystalline compounds with relatively low water-solubility.

Illustratively of the salts, the hydrochloric acid addition salt of 3-(2'-methylpiperidino)-propyl phenylacetate may be represented by the following formula:

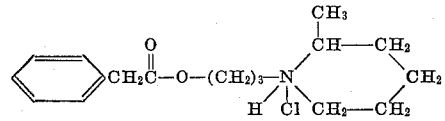

Compounds of the present invention have been found to be highly useful in therapeutics. Thus, when used as an anesthetic, 3-(2'-methylpiperidino)-propyl phenylacetate hydrochloride has been found to possess a high degree of potency, particularly with reference to nerve block. It produces a long term of anesthesia with no irritation. It possesses a low toxicity. Furthermore, it produces a desirable short-duration anesthesia when used in low concentrations. In comparison with procaine it possesses the advantage that it does not interfere with the therapeutic activity of the sulfanilamide type drugs which are commonly administered topically or orally as infection-combatting means.

The 3-(2'-methylpiperidino)-propyl phenylacetate of this invention may be prepared by esterification methods. Thus for example, it may be prepared in the form of its hydrohalide salt by reacting, preferably in an inert solvent, a phenylacetyl halide with 3-(2'-methylpiperidino)-propyl alcohol. Additionally it may be prepared as a hydrohalide salt by reacting phenylacetic acid with a 3-(2'-methylpiperidino)-propyl halide in a solvent such as isopropanol. For use in the above methods the halide of choice is the chloride, and when such halide is used 3-(2'-methylpiperidino)-propyl phenylacetate is isolated as the hydrochloric acid salt. From the hydrochloride thus prepared the free ester may be prepared by treatment with alkali.

Additional salts of 3-(2'-methylpiperidino)-propyl phenylacetate may be prepared by treating the ester with the appropriate acid. Furthermore, one salt of 3-(2'-methylpiperidino)-propyl phenylacetate may be converted to a different salt by treatment with the appropriate acid and preferential crystallization.

Specific examples further illustrating the preparation of the compounds of this invention are as follows:

Example 1

3-(2'-methylpiperidino)-propyl phenylacetate hydrochloride may be prepared as follows:

13 g. of 3-(2'-methylpiperidino)-propyl alcohol are dissolved in 70 cc. of dry benzene, the solution refluxed, and during refluxing 12.8 g. of phenylacetyl chloride are added thereto over a period of about one half hour. Refluxing is continued for two hours. Upon cooling to room temperature 3-(2'-methylpiperidino)-propyl phenylacetate hydrochloride precipitates in crystalline form. It is purified by recrystallization from isopropanol. 3 - (2' - methylpiperidino) - propyl phenylacetate hydrochloride thus prepared has been found to melt at about 129–131° C. and analysis has shown the presence of 11.37 per cent chlorine as compared with a calculated value of 11.38 per cent.

Example 2

3-(2'-methylpiperidino)-propyl phenylacetate, may be prepared as follows:

To 7 g. of 3-(2'-methylpiperidino)-propyl phenylacetate hydrochloride dissolved in 50 cc. of water is added a solution of 0.8 g. of sodium hydroxide dissolved in 10 cc. of water. The oily 3 - (2' - methylpiperidino) - propyl phenylacetate which separates is taken up in ether, the ether evaporated, preferably in a vacuum, leaving the 3-(2'-methylpiperidino)-propyl phenylacetate as a residual, colorless oil which may be further purified by distillation under reduced pressure.

Example 3

3-(2'-methylpiperidino)-propyl phenylacetate hydrochloride may also be prepared as follows:

27 g. of phenylacetic acid and 31 g. of 3-(2'-methylpiperidino)-propyl chloride are dissolved in 150 cc. of dry isopropanol and the mixture refluxed for about 12 hours. About half of the isopropanol is then distilled off and the residual solution cooled to about 0° C. 3-(2'-methylpiperidino)-propyl phenylacetate hydrochloride precipitates as a white crystalline compound. It is filtered off, washed once with ether and recrystallized from isopropanol. The 3-(2'-methylpiperidino)-propyl phenylacetate hydrochloride melts at about 129–131° C.

It may be noted that the compounds of this invention also may be prepared by processes of trans-esterification and condensation.

We claim:

1. 3-(2'-methylpiperidino)-propyl phenylacetate represented by the following formula:

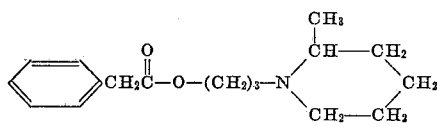

and its acid addition salts.

2. 3-(2'-methylpiperidino)-propyl phenylacetate hydrochloride represented by the following formula:

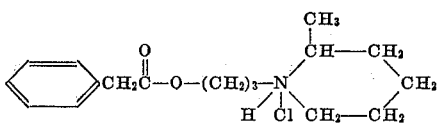

SAMUEL M. McELVAIN.
THOMAS P. CARNEY.

REFERENCES CITED

The following references are of record in the file of this patent:

UNITED STATES PATENTS

| Number | Name | Date |
|---|---|---|
| 1,784,903 | McElvain | Dec. 16, 1930 |

OTHER REFERENCES

Journal Amer. Chem. Soc., vol. 64, 428–433 (1942).

Journal Amer. Chem. Soc., vol. 55, 365–371 (1933).